United States Patent [19]

Braun

[11] Patent Number: 5,054,591
[45] Date of Patent: Oct. 8, 1991

[54] TRANSMISSION INPUT SECTION CONTROL

[75] Inventor: Eugene R. Braun, Royal Oak, Mich.

[73] Assignee: Eaton Corporation, Cleveland, Ohio

[21] Appl. No.: 595,873

[22] Filed: Oct. 11, 1990

[51] Int. Cl.⁵ .............................................. F16H 3/08
[52] U.S. Cl. .................................... 192/3.63; 74/475; 74/375
[58] Field of Search ................. 74/335, 359, 375, 475; 192/3.63

[56] References Cited

U.S. PATENT DOCUMENTS

| | | | |
|---|---|---|---|
| 3,945,265 | 3/1976 | Bell et al. | 74/335 |
| 4,261,216 | 4/1981 | Braun | 74/335 X |
| 4,735,109 | 4/1988 | Richards et al. | 74/745 |
| 4,766,774 | 8/1988 | Tamai | 74/335 X |
| 4,788,875 | 12/1988 | Genise | 74/335 X |
| 4,802,384 | 2/1989 | Schwarz et al. | 74/335 X |
| 4,831,894 | 5/1989 | Braun | 74/745 |
| 4,882,951 | 11/1989 | Braun | 74/745 |

FOREIGN PATENT DOCUMENTS 2111613  7/1983  United Kingdom ............... 192/3.63
2166208  4/1986  United Kingdom ............... 192/3.63

Primary Examiner—Allan D. Herrmann
Assistant Examiner—William O. Trousdell
Attorney, Agent, or Firm—H. D. Gordon

[57] ABSTRACT

A control (68) for controlling the input section (12) of a manually shifted compound synchronized transmission (10) of the type comprising the splitter type input section (12) connected in series with a manually shifted synchronized multi-speed main transmission section (14) is provided. The control is effective upon sensing disengagement of the master clutch (20) and nonegagement of the main transmission section (14) to cause the input section (12) to be shifted to and maintained in the not engaged (N) position thereof and thereafter to cause the input section to be shifted to the preselected ratio thereof (H or L). The control is also effective with the main transmission section in the disegaged position upon engagement of the master clutch to momentarily cause the input section to be shifted to one of the engaged ratios thereof allowing the synchronized jaw clutches of the main transmission section to be engaged in start-from-stop operations.

11 Claims, 12 Drawing Sheets

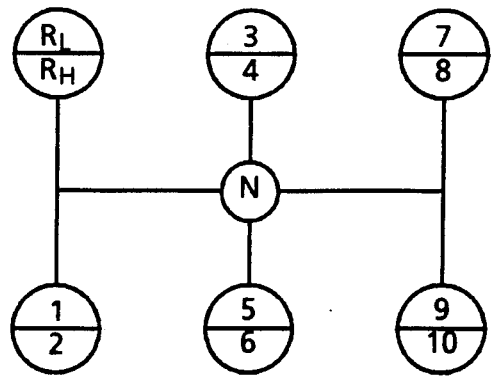
FIG. 2
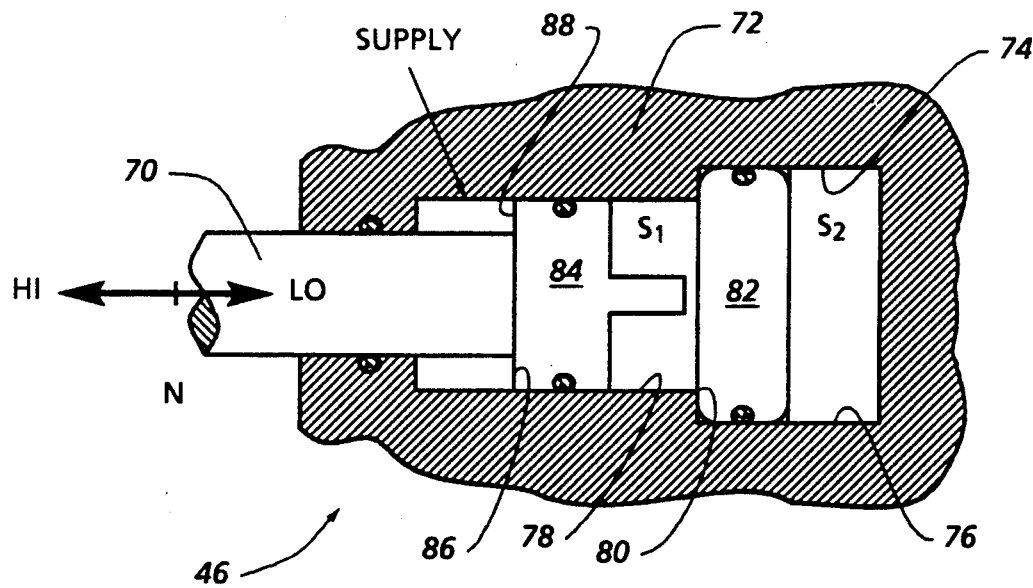
FIG. 3
| ACTUATOR POSITION | $S_1$ | $S_2$ |
|---|---|---|
| HIGH | ON | ON |
| HIGH | ON | OFF |
| N | OFF | ON |
| LOW | OFF | OFF |
FIG. 4

TRANSMISSION INPUT SECTION CONTROL

BACKGROUND OF THE INVENTION

1. Field of the Invention

The present invention relates to a control for controlling the shifting of an input section of a vehicular compound transmission. In particular, the present invention relates to a control for controlling the shifting of a synchronized, splitter-type input section of a compound transmission having a manually shifted, preferably synchronized, main transmission section and a remote selector for selecting/preselecting an engaged input section ratio.

More particularly, the present invention relates to a control of the type described above wherein, upon disengagement of the vehicle master clutch and disengagement of the main transmission section, the input section is automatically shifted into a nonengaged or neutral position which will reduce the time and forces necessary to synchronize and shift the main transmission section. Further, the control will retain the input section in the nonengaged condition until a main transmission section ratio is engaged, except for an instantaneous shift engagement and then disengagement of an input section ratio, preferably, low speed ratio, upon engagement of the master clutch to allow rotation of the main section synchronizer blockers off the blocked condition/position thereof for start from stop gear engagement.

2. Description of the Prior Art

Compound mechanical transmissions of the input splitter type and compound transmissions utilizing input auxiliary sections are known in the prior art as may be seen by reference to U.S. Pat. Nos. 2,886,982; 3,741,035; 4,485,692; 4,882,951; and 4,831,894, the disclosures of all of which are hereby incorporated by reference. Compound transmissions of the splitter or range type, or a combination thereof, are well known in the prior art as may be seen by reference to U.S. Pat. Nos. 3,105,395; 4,735,109; and 4,788,889, the disclosures of all of which are hereby incorporated by reference.

Automatic and semi-automatic transmission and clutch controls are known in the prior art as may be seen by reference to U.S. Pat. Nos. 4,081,065; 4,361,060; and 4,648,290, the disclosures of all of which are hereby incorporated by reference. Synchronized mechanical change gear transmissions and transmission sections are well known in the prior art as may be seen by reference to U.S. Pat. Nos. 4,018,319; 4,373,403; and 4,432,251, the disclosures of all of which are hereby incorporated by reference.

While compound mechanical (i.e., engaging ratios by means of positive clutches) heavy duty vehicular change gear transmissions of the synchronized type having input auxiliary sections of the splitter type are known, such transmissions have required an undesirably large effort and/or period time to achieve main section shifting, and have not automatically disengaged and/or reengaged the input section under specified conditions, and require expensive and/or complicated shift assist mechanisms and/or have required a disconnect member with relatively complicated controls therefor.

SUMMARY OF THE INVENTION

In accordance with the present invention, the drawbacks of the prior art are minimized or overcome by provision of a relatively simple and efficient control mechanism for a compound manually shifted synchronized transmission of the type having a splitter type input section which will cause the input section to be placed in a nonengaged position upon disengagement of the vehicle master clutch and of the main transmission section and which will maintain the splitter type input section in the not engaged condition until a ratio in the main transmission section is fully engaged. Preferably, the control is also effective, at vehicle start up if a main transmission section is not engaged, to, upon engagement of the master clutch, cause a momentary engagement and then disengagement of one of the input section ratios, preferably the low speed input section ratio, to cause a momentary rotation of the main transmission section gearing and shafts to allow the main section synchronizers to be moved off the initial block positions thereof.

In a transmission embodiment utilizing a two-speed splitter type input section, the above is accomplished by utilizing a three-position actuator having a first position for engaging the high-speed input section ratio, a second position for engaging a low speed section input ratio and a third position wherein the input section is in a nonengaged or neutral condition. Preferably, the three-position actuator is a piston and cylinder assembly defining three chambers, one of which is constantly pressurized and the other two of which may be independently pressurized or exhausted to atmosphere by valving means such as well known solenoid controlled two-position three-way valves.

Operation of the solenoid valves is preferably controlled by control means receiving a first input indicative of engagement or disengagement of the master clutch, a second input indicative of engagement or nonengagement of the main transmission section, a third input indicative of the operator selection of either the high or low speed splitter section ratio and a fourth input indicative of either input section high speed ratio engaged, input section low speed ratio engaged or input section not engaged. Preferably, the control also has means to sense initial engagement of the master clutch and to provide a momentary input indicative thereof.

Accordingly, it is an object of the present invention to provide a new and improved transmission input section control for synchronized manual transmissions of the type having splitter type auxiliary input sections connected in series with main transmission sections which is effective, upon disengagement of the vehicle master clutch of the main transmission section to automatically cause the input section to be shifted to the nonengaged or neutral condition thereof and further is effective to maintain the input section in the nonengaged or neutral condition thereof until full engagement of a main transmission section ratio.

This and other objects and advantages of the present invention will become apparent from a reading of the detailed description of the preferred embodiment taken in connection with the attached drawings.

DESCRIPTION OF THE DRAWINGS

FIG. 2 is a schematic illustration of the shift pattern for the transmission of FIG. 1.

FIG. 3 is a schematic illustration of the three-position actuator for the splitter type transmission input section of the present invention.

FIG. 4 is a chart illustrating the actuator position corresponding to various solenoid controlled valve conditions of the preferred embodiment of the control of the present invention.

DESCRIPTION OF THE PREFERRED EMBODIMENT

Figure 1:
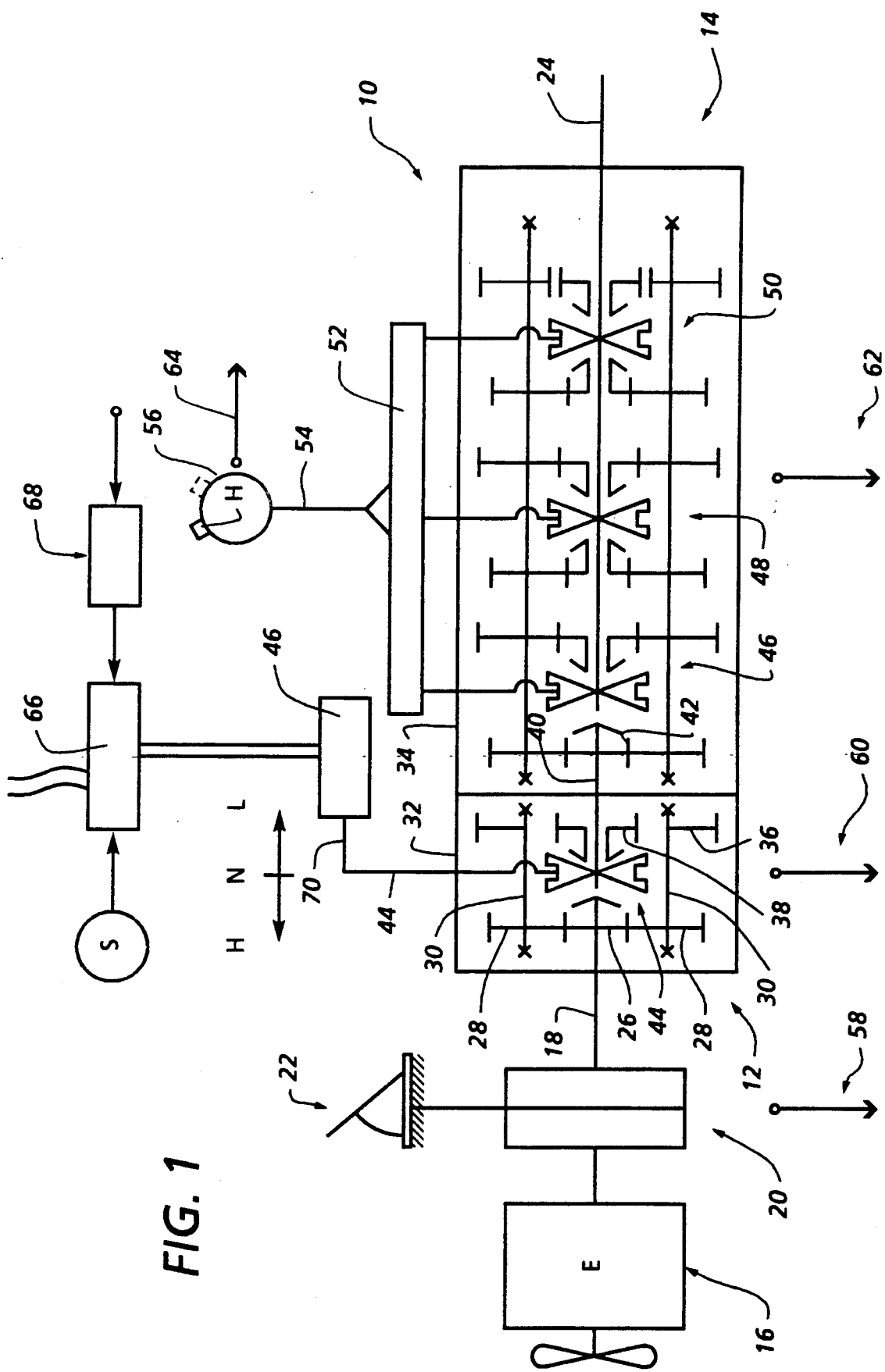
FIG. 1 is a schematic illustration of a manual vehicular synchronized compound transmission of the type having a splitter type input section and utilizing the control of the present invention.

Certain terminology will be used in the following description for convenience and reference only and will not be limiting. The words "upwardly", "downwardly", "rightwardly" and "leftwardly" will designate directions in the drawings to which reference is made. The words "forward" and "rearward" will refer respectively to the front and rear end of the transmission as same is conventionally mounted in the vehicle, being respectively from left to right sides of the transmission as illustrated in FIG. 1. The words "inwardly", and "outwardly", refer to directions towards and away from, respectively, the geometric center of the device and designated parts thereof. The above applies to the words above specifically mentioned, derivatives thereof and words of similar import.

The term "compound transmission" is used to designate a transmission having a main transmission section and an auxiliary transmission section connected in series whereby the selected gear reduction in the main transmission section may be compounded by further selected gear reduction in the auxiliary transmission section. The term "input section" is used to designate the transmission section connected in series between the vehicular prime mover, such as a vehicle engine, and the main transmission section. The term "splitter type compound transmission" or "splitter-type transmission section" as used herein will designate a compound transmission where the auxiliary transmission is used to provide various selectable steps or subdivisions for the gear ratio selected in the main transmission section. In a splitter type compound transmission, the main transmission section is typically provided with relatively wide ratio steps which are split or subdivided by the splitter type auxiliary transmission section. Splitter type compound transmission sections are well known in the prior art and examples thereof may be seen by reference to the above-mentioned U.S. Pat. Nos. 4,735,109; 3,741,035; 4,485,692; 4,882,951; and 4,831,894.

The term "synchronized transmission" or "synchronized transmission section" shall designate a change gear transmission or transmission section wherein a selected gear is nonrotably coupled to a shaft by means of a positive clutch, attempted engagement of said clutch is prevented until the members of the clutch are rotating at substantially synchronous rotational speed and frictional means associated with the clutch members are sufficient, upon initiation of a clutch engagement, to cause the clutch members, and all members rotating therewith, to rotate at a substantially synchronous speed of rotation.

A heavy-duty, compound, manually shifted change gear transmission 10 having a two-speed splitter type input section 12 connected in series with a five-forward speed one-reverse speed main transmission section 14 is schematically illustrated in FIG. 1. Briefly, a vehicular prime mover such as engine 16 is coupled to the input shaft 18 of transmission 10 by means of a normally engaged selectively disengageable master friction clutch 20, the engaged or disengaged position thereof being controlled by an actuator such as manual clutch pedal 22. The transmission output shaft 24 of transmission 10 is typically drivingly connected to the vehicular drive wheels (not illustrated) as is well known in the prior art.

The transmission input shaft 18 carries an auxiliary section input gear 26 rotationally fixed thereto which is constantly meshed with auxiliary section countershaft gears 28 carried by auxiliary countershafts 30. Auxiliary section countershafts 30 are supported by bearings in the auxiliary section housing 32 which is preferably attached to and/or integral with the main section housing 34. The auxiliary section countershafts 30 also carry a second auxiliary section countershaft gear 36 which is constantly meshed with auxiliary section output gear 38. The auxiliary section output gear 38 surrounds and is relatively rotatable relative to auxiliary section output shaft 40 which comprises the input shaft to the main transmission section 14. Shaft 40 also carries main section input gear 42 rotationally fixed thereto.

A double-sided synchronized jaw clutch member 44 is provided for selectably clutching either gear 38 to shaft 40 for low-speed operation of input section 12 or input shaft 18 directly to shaft 40 for high speed or direct drive operation of input section 12. Preferably, the synchronized jaw clutch member 44 is of a relatively standard design as is well known in the prior art and as may be seen by reference to U.S. Pat. Nos. 4,462,489; 4,125,179; and 2,667,955, the disclosures of all of which are hereby incorporated by reference.

Double-ended synchronized clutch member 44 may be axially displaced leftwardly to engage the high speed input section ratio, axially displaced rightwardly to engage the low-speed input section ratio or maintain in its centered position as illustrated in FIG. 1 to maintain the input section in a nonengaged condition, by means of a shift fork 44 controlled by an actuator 46 as will be described in greater detail below.

Preferably, the main transmission section 14 is a five-forward speed one-reverse speed simple transmission of the synchronized transmission type as well known in the prior art and as may be appreciated in greater detail by reference to above-mentioned U.S. Pat. Nos. 4,432,251; 4,373,403; and 4,018,319.

The synchronized jaw clutch members 46, 48 and 50 of the main transmission section are axially displaceable, one at a time, by means of a shift bar housing assembly 52 manipulated by an operator controlled shift lever 54.

A remote master control unit 56, preferably located in the shift lever knob, is provided allowing the operator to select, or preselect, either a low or high speed operation of the splitter input section. Shift bar housings, shift levers and remote master control members of the type illustrated are well known in the prior art as may be seen by reference to U.S. Pats. Nos. 4,735,109; 4,920,815; 4,788,889; and 4,788,875, the disclosures of all of which are hereby incorporated by reference.

The shift pattern for compound input splitter type manual transmission 10 may be seen by reference to FIG. 2.

The transmission control system includes a first sensor 58 for providing a signal indicative of the not fully disengaged or fully disengaged condition of the master clutch 20, a second sensor 60 for providing signals indicative of high ratio full engagement, low ratio full engagement or not fully engaged condition of the input section 12, a sensor 62 for providing a signal indicative of the fully engaged or not fully engaged condition of the main transmission section 14 and a sensor 64 for providing a signal indicative of operator selection/preselection of either the low or high speed ratio of the input section 12. Sensors 58, 60, 62 and may be of any known type, examples of which may be seen by reference to U.S. Pat. Nos. 4,676,115; 4,702,127; and 4,853,629 the disclosures of which are hereby incorporated by reference.

Input section actuator 46 may be of the piston/cylinder type comprising a plurality of chambers, one or more of which are selectively pressurized or exhausted by means of one or more three-way/two-position solenoid controlled valves, usually contained in a manifold member 66 having a source of pressurized fluid and a source of electrical power. Control of the solenoid valve members of the manifold member 66 is by means of the control assembly 68 of the present invention which will be described in greater detail below. Solenoid controlled fluid actuated shift mechanisms for change speed transmissions are well known in the prior art and an example thereof may be seen by reference to U.S. Pat. No. 4,722,237, the disclosure of which is hereby incorporated by reference.

A schematic illustration of the pressurized fluid operated actuation member 46 may be seen by reference to FIG. 3. A piston rod 70 is axially movable in actuator housing 72 and carries the shift fork 44 for axial movement therewith. The housing defines an internal bore 74 having an enlarged diameter portion 76 and a reduced diameter portion 78 intersecting at a shoulder 80. A first piston member 82 is slidably and sealingly received within the enlarged diameter bore portion 76 while a second piston member 84 is slidably and sealingly received within the reduced diameter bore portion 78. A stub shaft 86 extends rightwardly from the piston 84 for abutting engagement with the leftward face of piston member 82. Piston shaft 70 is integral with or fixed to piston member 84 for axial movement therewith.

The rightward face of piston member 82 and enlarged diameter bore portion 76 defined a chamber S2 the pressurization and exhaust of which is controlled by solenoid controlled valve S2. The rightward face of piston 84 and the leftward face of piston 82 and the reduced diameter bore portion 78 defined a chamber S1 the pressurization and exhaust of which is controlled by solenoid control valve S1. The leftward face of piston 84 and the reduced diameter portion 78 defined a third chamber S3 which is constantly exposed to pressurized fluid. Shoulder 80 limits leftward movement of piston 82 and the rightward face 86 of piston 84 is of a larger surface area than the leftward face 88 of piston 84.

As may be seen by reference to FIG. 4, whenever chamber S1 is pressurized, regardless of the condition of chamber S2, shaft 70 will be displaced in the leftward direction for engagement of the high-speed input section ratio, whenever chamber S1 is exhausted and chamber S2 is pressurized, shaft 70 will be in the axially nondisplaced position whereby the input section 12 is in the nonengaged position thereof and whenever both of chambers S1 and S2 are exhausted, shift 70 will be displaced rightwardly for engagement of the low-speed input section ratio. Of course, various other three-position pressurized fluid actuated actuator assemblies could be utilized in place of the actuator 46 illustrated in FIG. 3.

Figure 5:
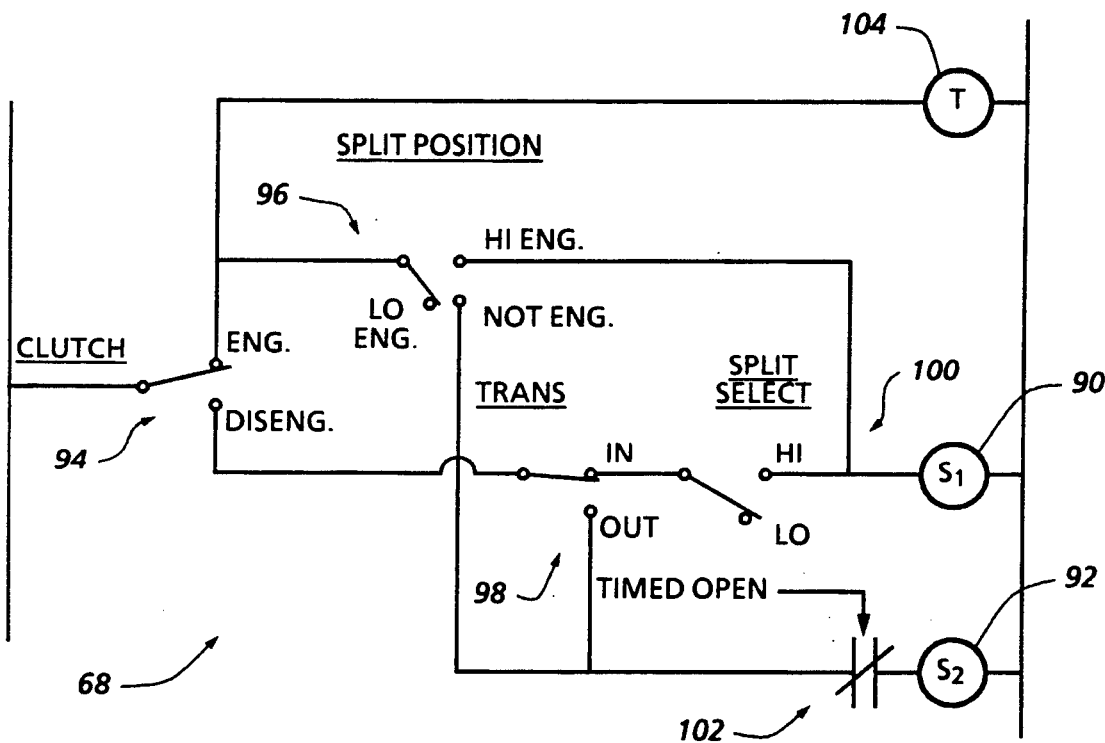
FIG. 5 is a schematic illustration of the control of the present invention illustrating the position of the various control switches when operating in the low-speed input section ratio.
Figure 6:
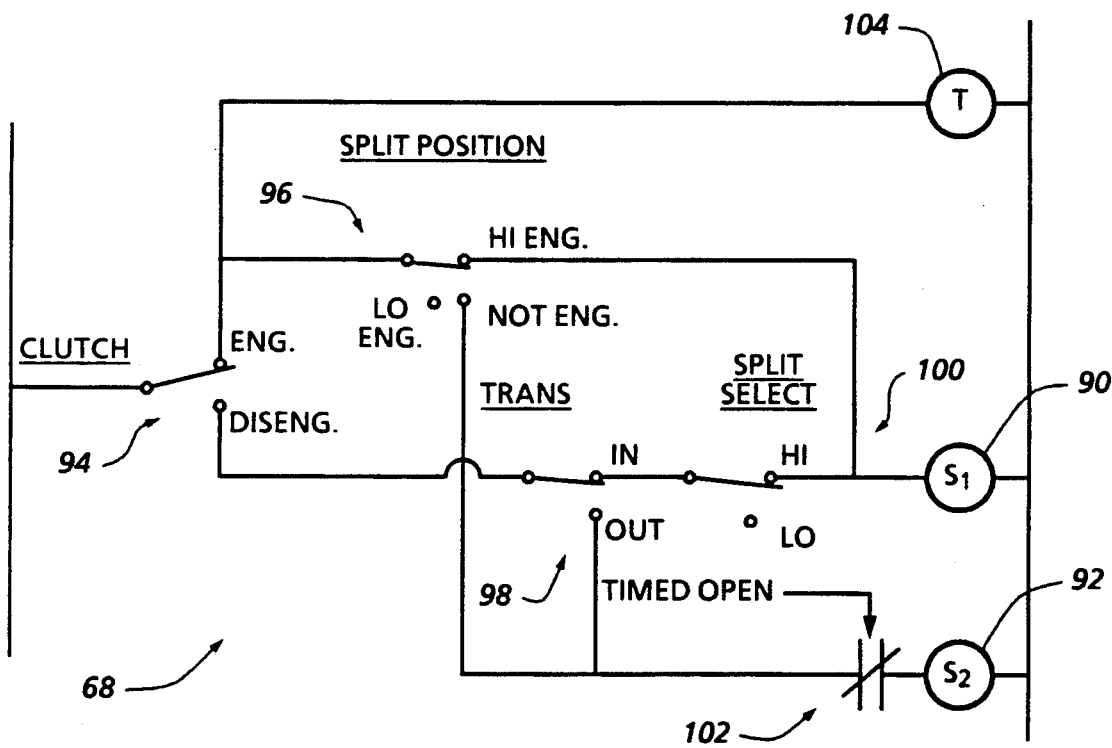
FIG. 6 is a schematic illustration of the control of the present invention illustrating the configuration of the various control switches when operating in the high-speed radio of the input section of the present invention.

A schematic representation, in ladder circuit format, of the control 68 of the present invention, when at steady state operation in the low speed and high speed input section ratios, respectively, may be seen by reference to FIGS. 5 and 6, respectively. The purpose of control circuit 68 is, of course, to control the operation of the solenoid controlled valves S1 and S2 by energizing or deenergizing the solenoids 90 and 92. In the example of the present invention, solenoid controlled valves S1 and S2 are two-position three-way valves which, when energized, will connect the outlet ports thereof to the source of pressurized fluid and, when not energized, are effective to connect the outlet ports thereof to an exhaust. Solenoid controlled valves of this type are, of course, well known in the prior art and an example thereof may be seen by reference to U.S. Pat. Nos. 3,722,237 and 4,928,544, the disclosures of which are hereby incorporated by reference.

While a discrete element control circuit 68 is illustrated by way of example, a microprocessor based or other type of controller could be substituted therefor.

Control circuit 68 include a two-position switch 94 having a first position 94A corresponding to the engaged condition of the master clutch and a second position 94B corresponding to the disengaged position of the master clutch 20. Switch 94 is associated with sensor 58. A three-position switch 96 is positioned in accordance with the condition of the transmission input section 12 and has a first position 96A corresponding to engagement of input section high gear and a second position 96B corresponding to engagement of input section low gear and a third position 96C corresponding to nonengagement of the transmission input section. Switch 96 is associated with sensor 60. A two-position switch 98 corresponds to the engaged or reduced engaged condition of the main transmission section 14. Two position switch 98 has a first position 98A corresponding to full engagement of the main transmission section and a second position 98B corresponding to not full engagement of the main transmission section. Switch 98 is associated with sensor 62. Two-position switch 100 corresponds to the position of the operator selector 56 and has a first position 100A corresponding to selection or preselection of input section high gear and a second position 100B corresponding to selection/preselection of input section low gear. Switch 100 is associated with sensor 64.

Circuit 68 additionally includes a normally closed/timed open contact 102 which will respond to energization of solenoid 104 to momentarily open and then immediately close. Preferably, the duration of normally closed/time opened contact 102 remaining open is preferably about one-tenth (1/10th) of one second (0.1 sec.). The purpose and function of the normally closed/time open contact 102 and solenoid 104 will be described in greater detail below.

Referring to FIG. 5, both solenoids 90 and 92 are deenergized and thus the input section 12 is in a stable low-speed ratio condition. Referring to FIG. 6, solenoid 90 is energized through switch 94 and 96 and thus the input section 12 is in a stable high-speed ratio position.

For illustrative purposes, the sequential operation of control 68 for several shifting operations of the transmission system of FIG. 1 will be illustrated and discussed.

Figure 7A:
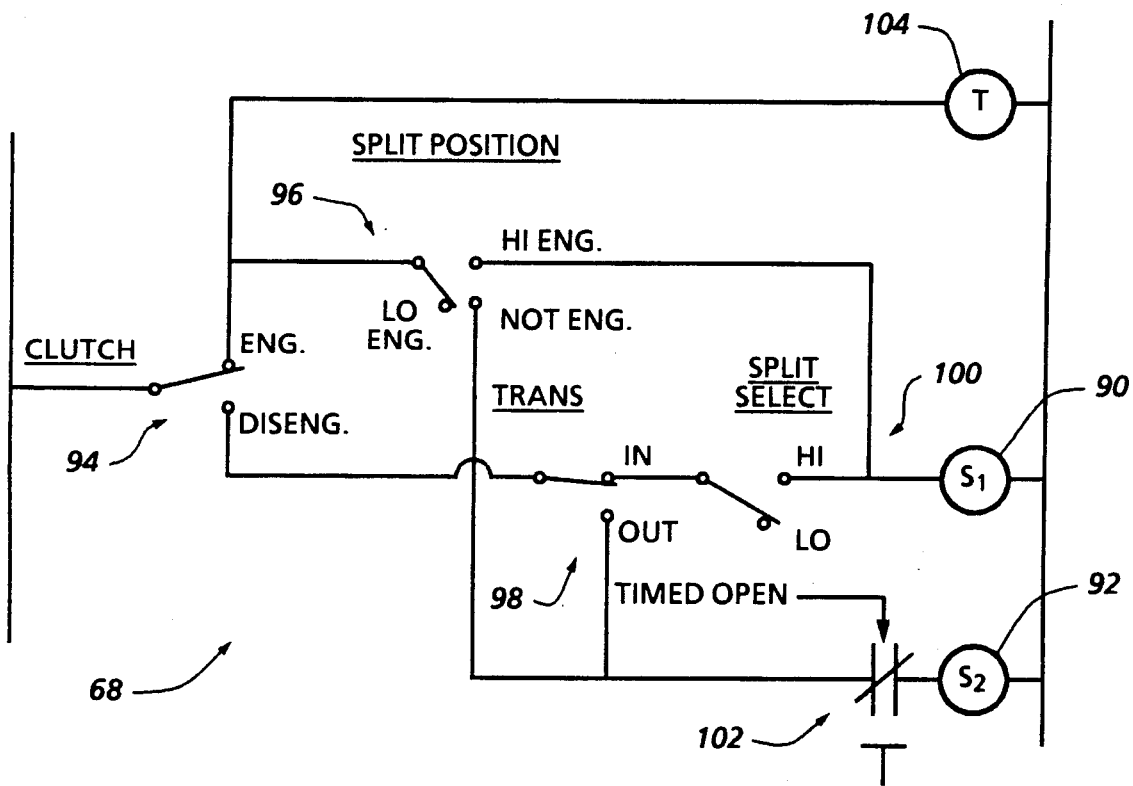
FIGS. 7A-7E are schematic illustrations of the control of the present invention in a sequence wherein the input section is shifted from low-speed to high-speed ratio.
Figure 7B:
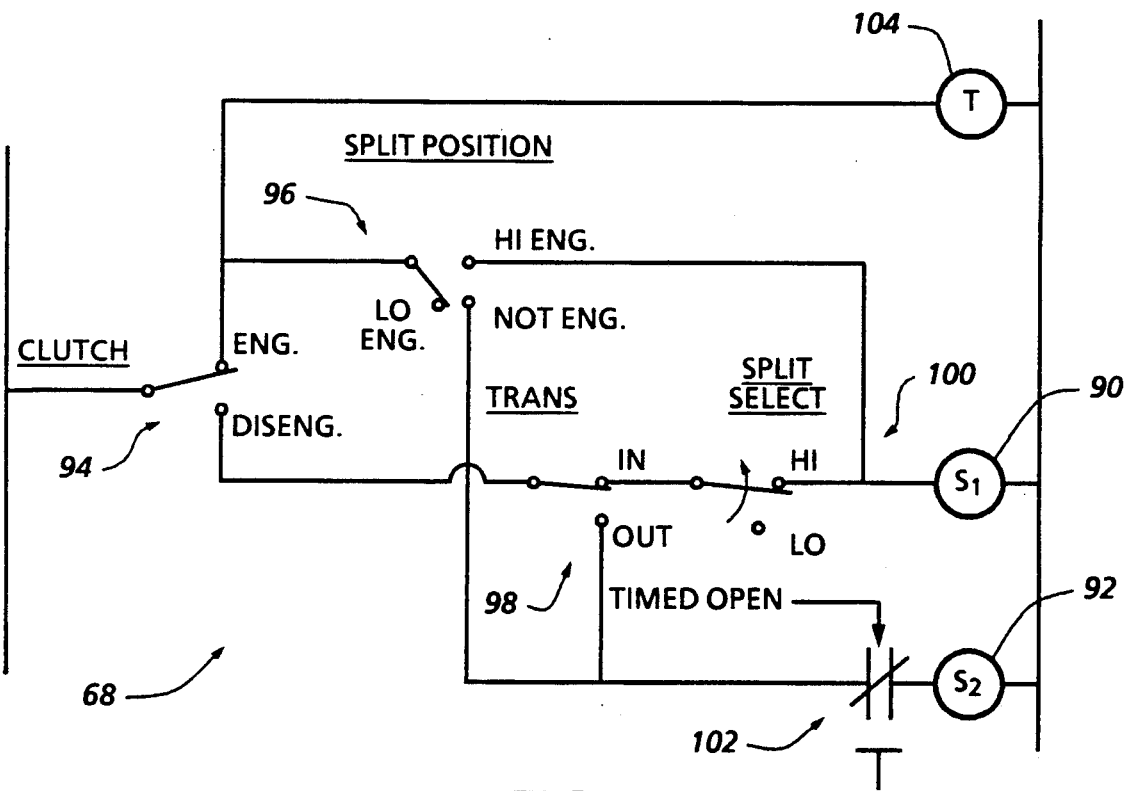
Figure 7C:
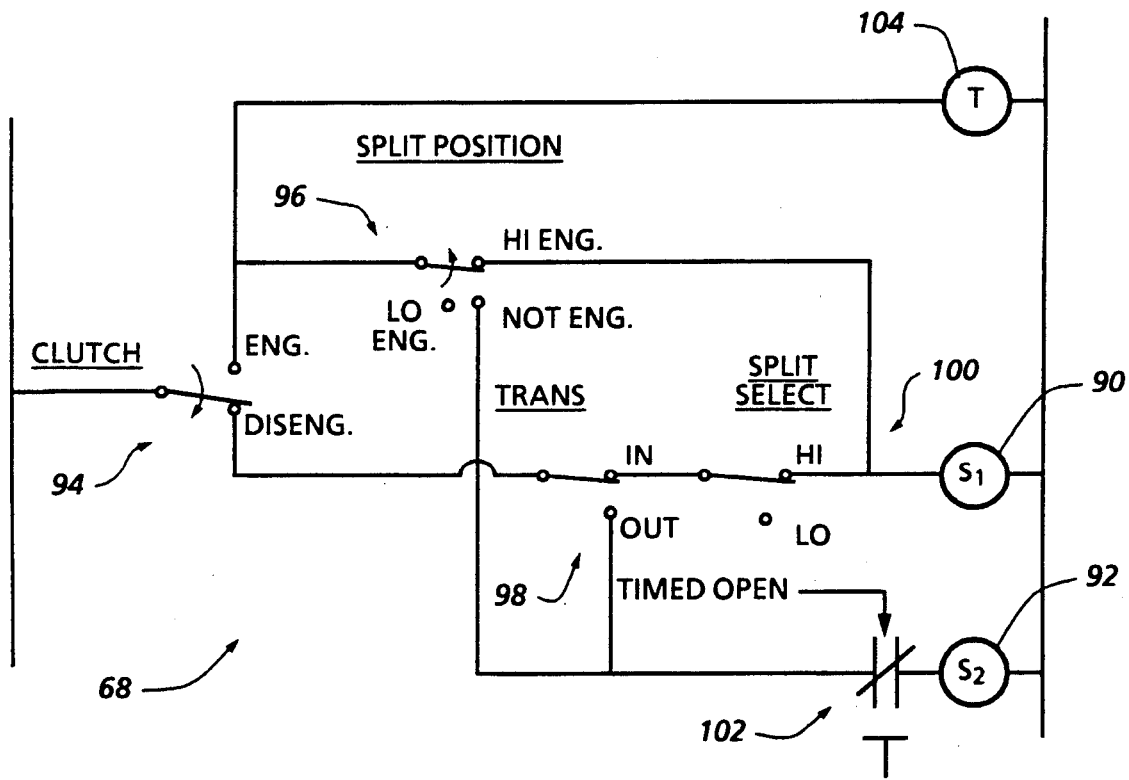
Figure 7D:
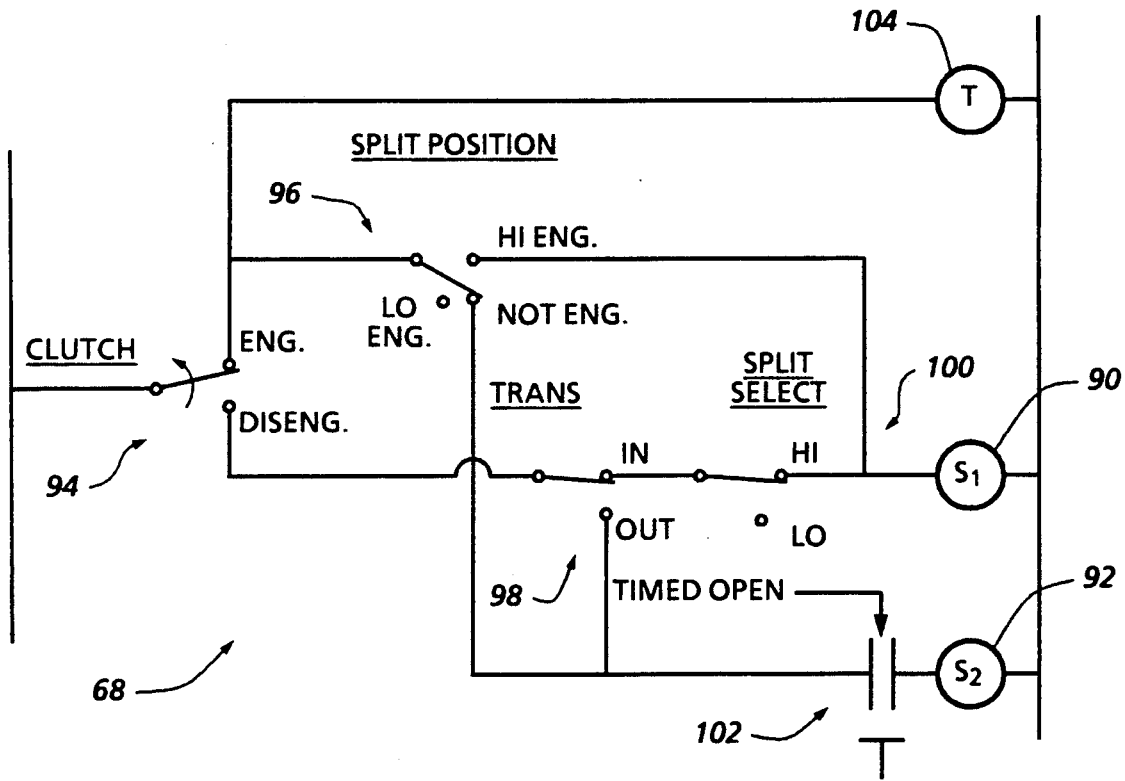
Figure 7E:
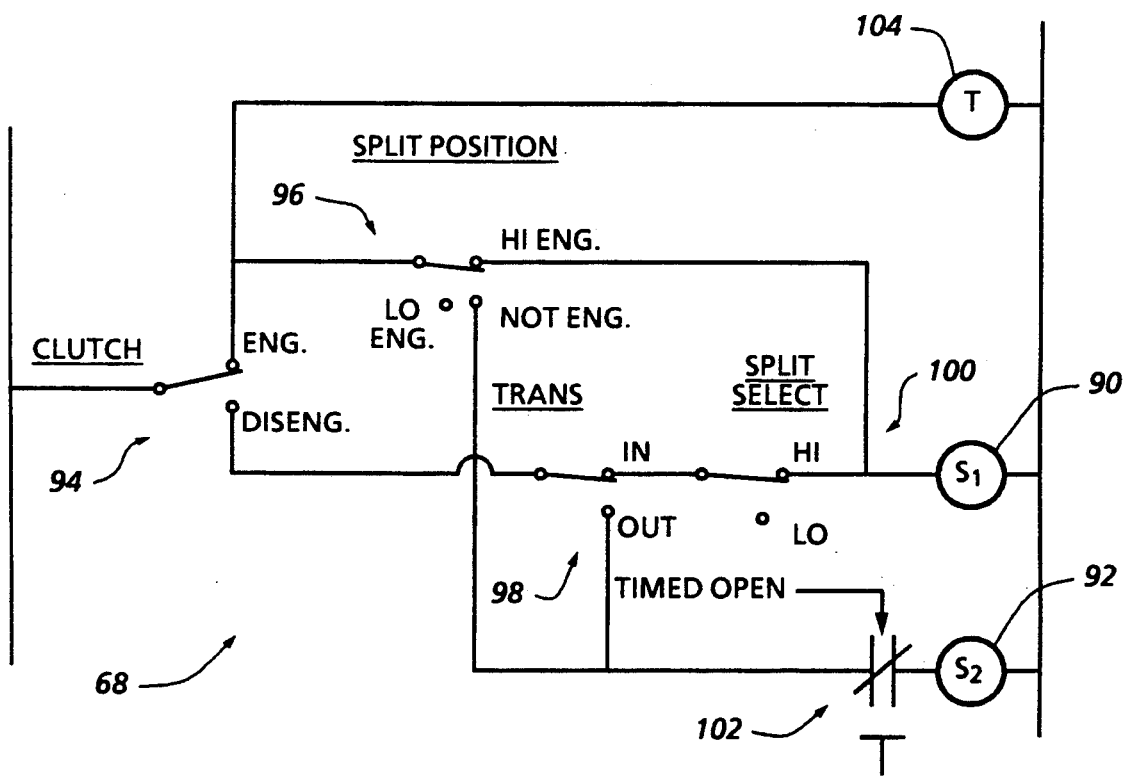

FIGS. 7A-7E are illustrative of the sequence of operation of control 68 during a shift in the input splitter section 12 only from low-speed ratio to high-speed ratio, such as a shift from third to fourth gear of the transmission 10 illustrated in FIGS. 1 and 2. FIG. 7A corresponds to FIG. 5 in that the transmission 10 is operating with the input section in the low-speed ratio thereof. In FIG. 7B the operator has preselected a shift to the high-speed input section ratio as may be seen at switch 100. This will have the effect of energizing solenoid 90 through switch 98 and 100. However, as a torque break in the transmission drive line has not yet occurred, the input section will remain engaged in the low-speed ratio. In FIG. 7C, the master clutch is disengaged allowing the input section to shift to the high-speed ratio thereof, and causing switches 94 and 96 to change the positions thereof. In 7D as the master clutch is reengaged, the solenoid T is energized through switch 94 causing contact 102 to be momentarily timed open which will energize solenoid 92 but will not result in any change in the condition of actuator 46. In FIG. 7E contact 102 is returned to the normally closed position thereof and the control circuit 68 is back to the stable condition of input section high-speed operation. FIG. 7E corresponds to FIG. 6.

Figure 8A:
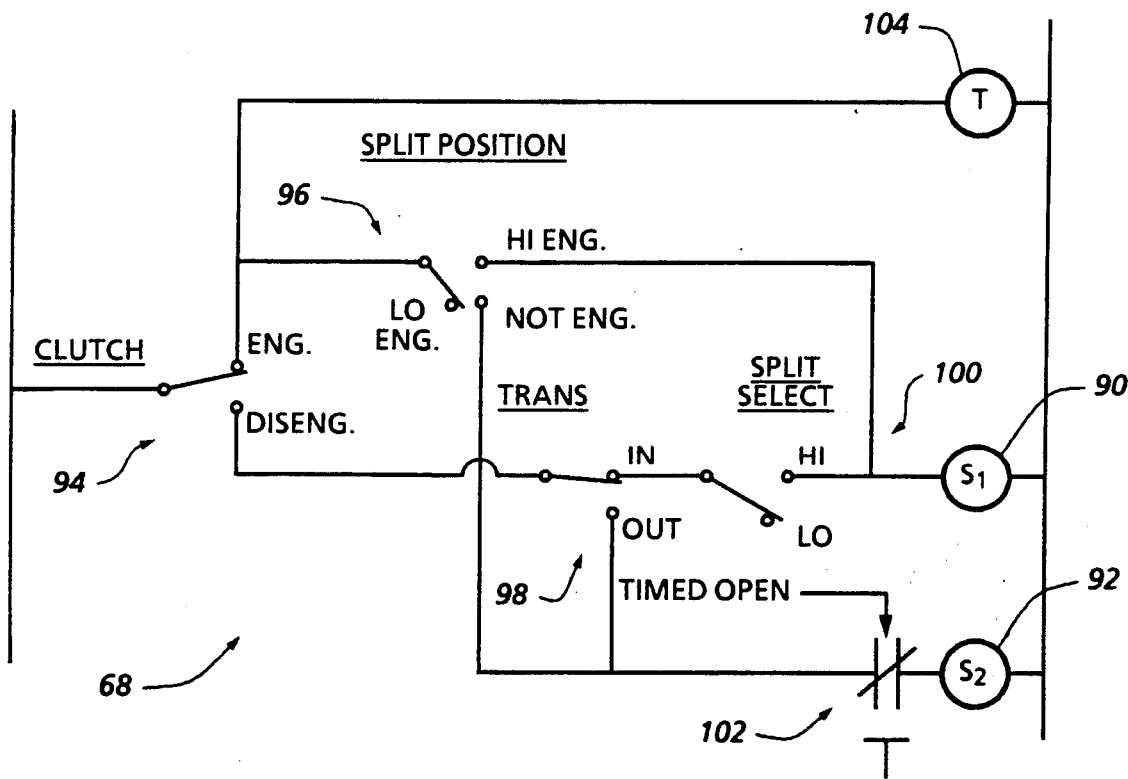
FIGS. 8A-8E are schematic illustrations of the control of the present invention in the sequence involving a main transmission section shift while retaining the input section in the low speed ratio thereof.
Figure 8B:
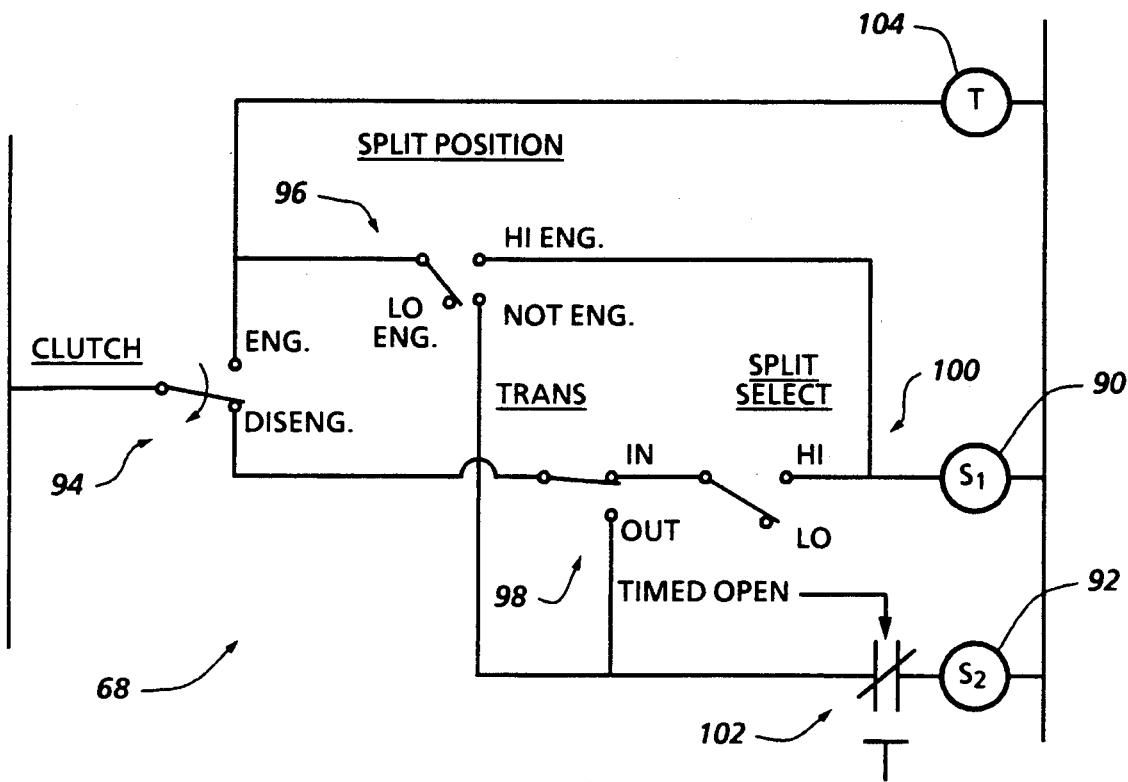
Figure 8C:
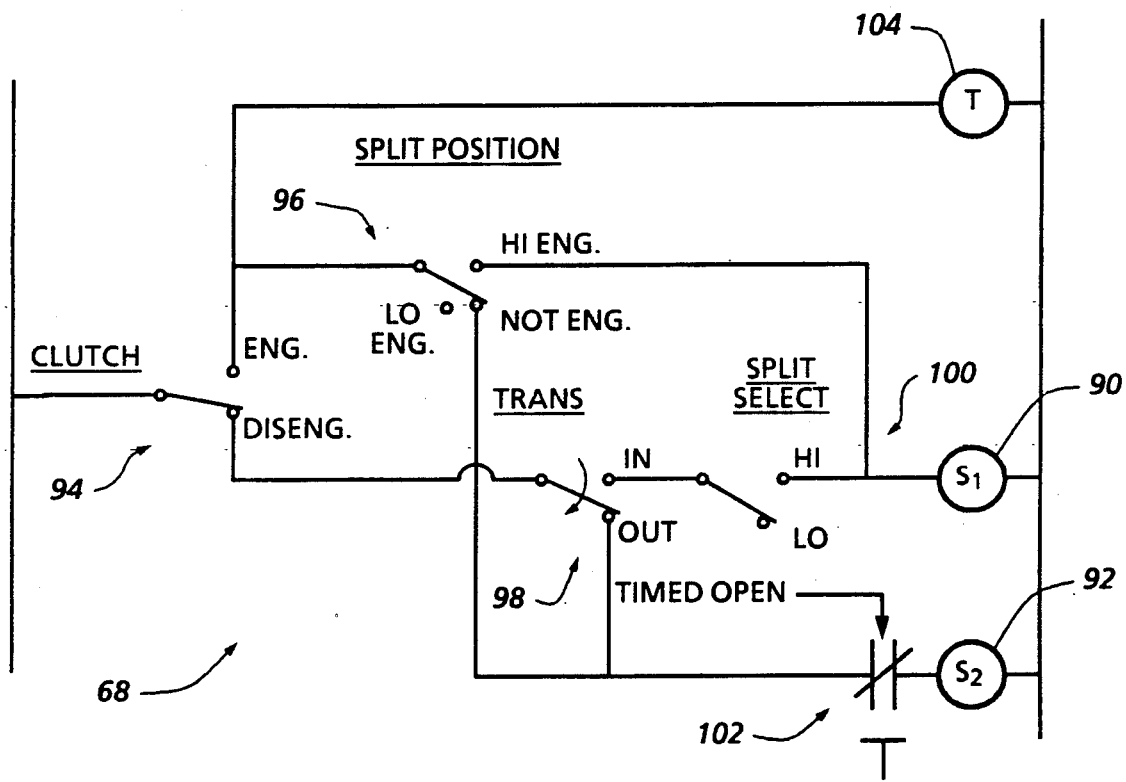
Figure 8D:
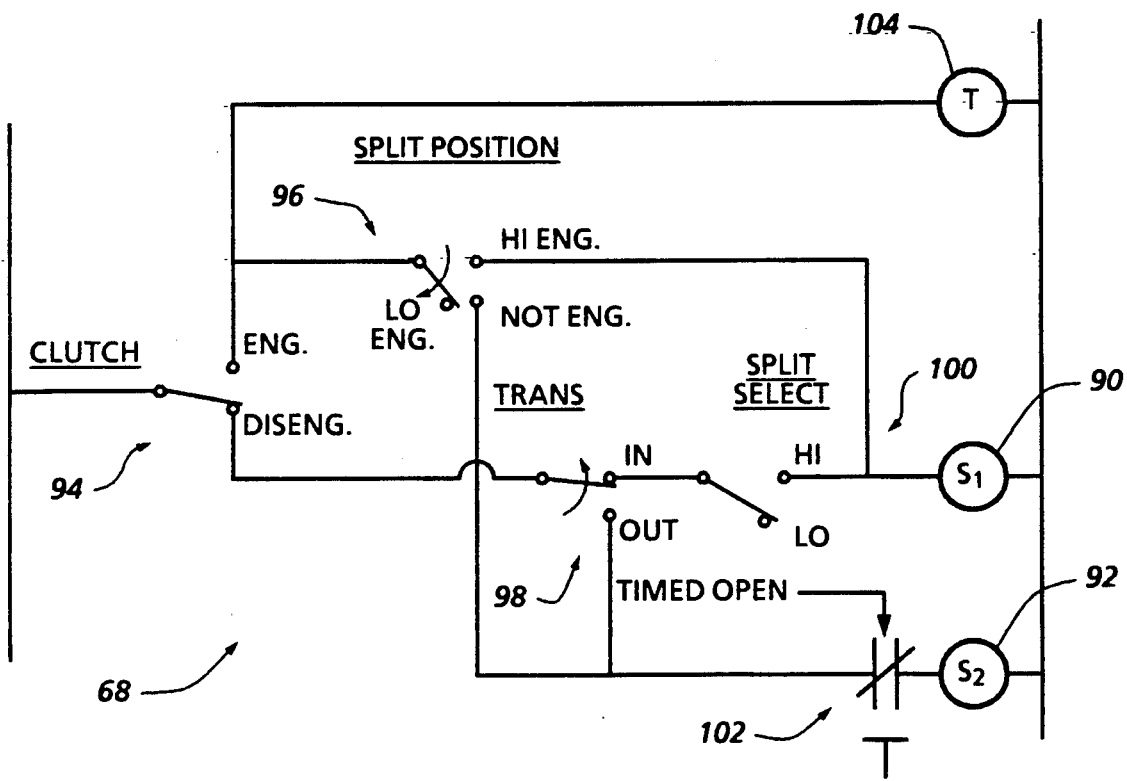
Figure 8E:
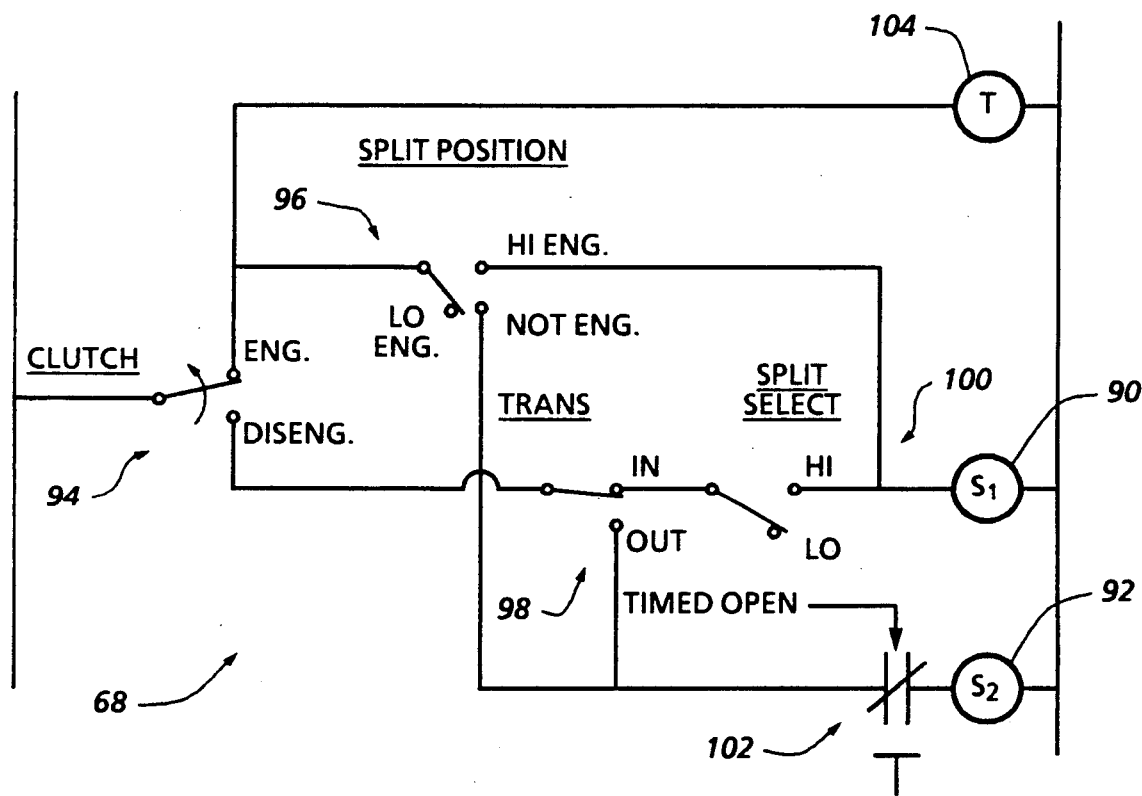

FIGS. 8A-8E schematically illustrate the sequence of operation of control circuit 68 during a shift of the main transmission section 14 only while the input section 12 remains in the low-speed ratio thereof. FIG. 8A corresponds generally to FIGS. 5 and 7A with the input section 12 stably engaged in the low-speed ratio thereof. In FIG. 8B, the master clutch is disengaged, changing the position of switch 94 and both solenoids 90 and 92 will remain in the deenergized states thereof and, thus, the input section will remain engaged in the low speed ratio thereof. In FIG. 8C, a shift transient occurs in the main transmission section 14 causing switch 98 to change positions thereof which will result in solenoid 92 being energized across switch 94, switch 98 and contact 102 whereby the input section will be shifted to the neutral position thereof. In FIG. 8D, the main transmission section has been fully engaged causing switch 98 to change positions thereof while the master clutch remains disengaged. As the main transmission section achieves engagement, solenoid 92 is deenergized and the input section 12 will revert to engagement of the low speed ratio thereof. In FIG. 8E, the master clutch is reengaged which will cause a momentary opening and then closing of contact 102 which will have no effect on the deenergized state of solenoid 92 and, thus, the input section will remain engaged in the low speed ratio thereof. FIG. 8E corresponds to FIG. 8A.

Figure 9A:
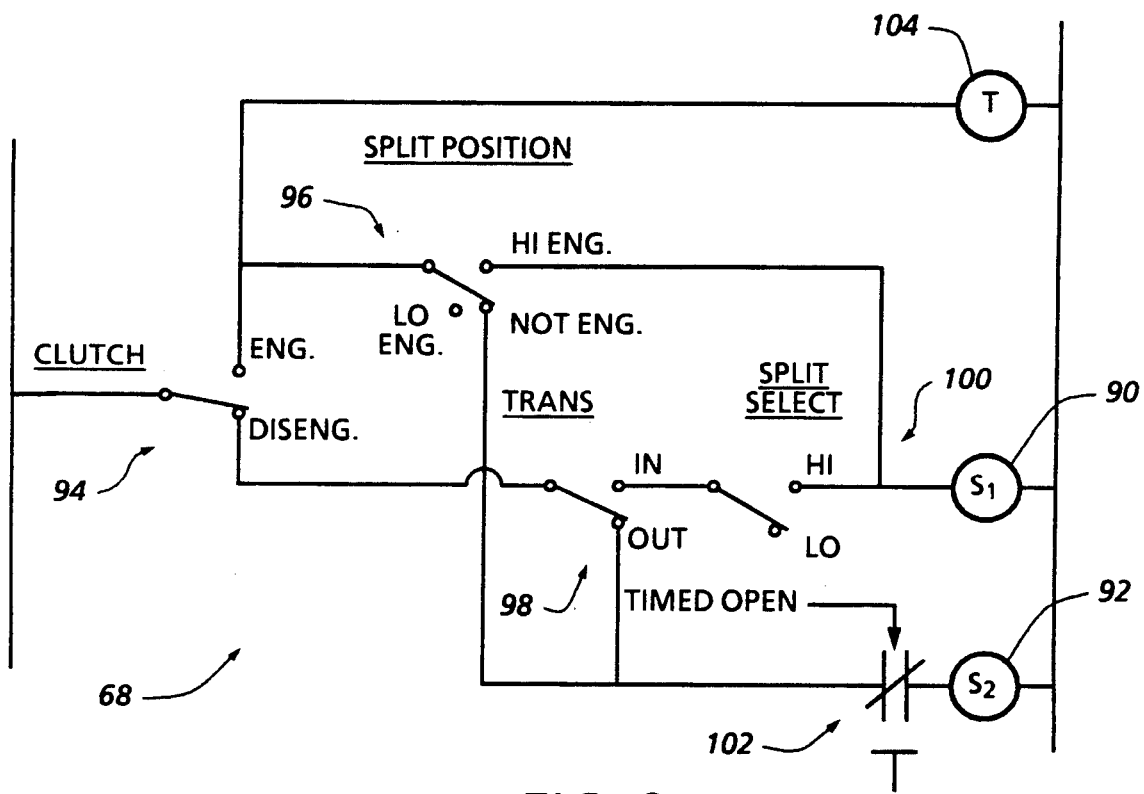
FIGS. 9A-9E are schematic illustrations of the control of the present invention in the start-from-stop mode of operation with the input section in the low-speed ratio thereof.
Figure 9B:
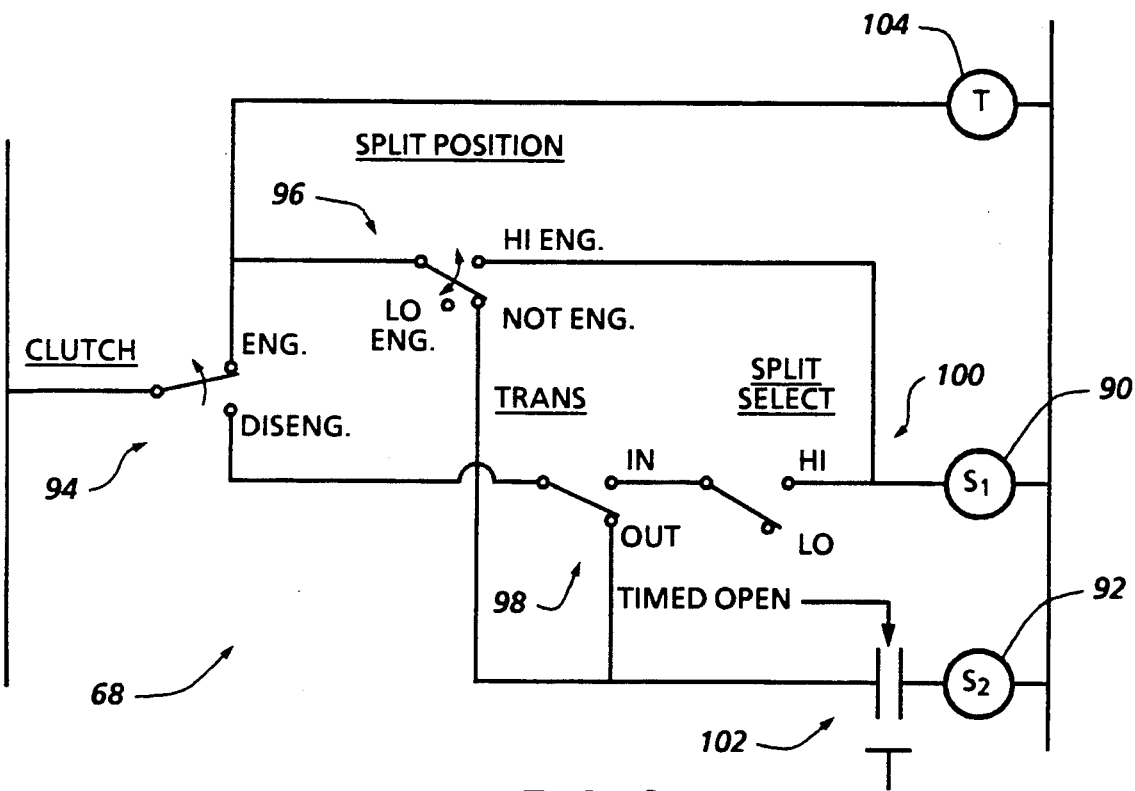
Figure 9C:
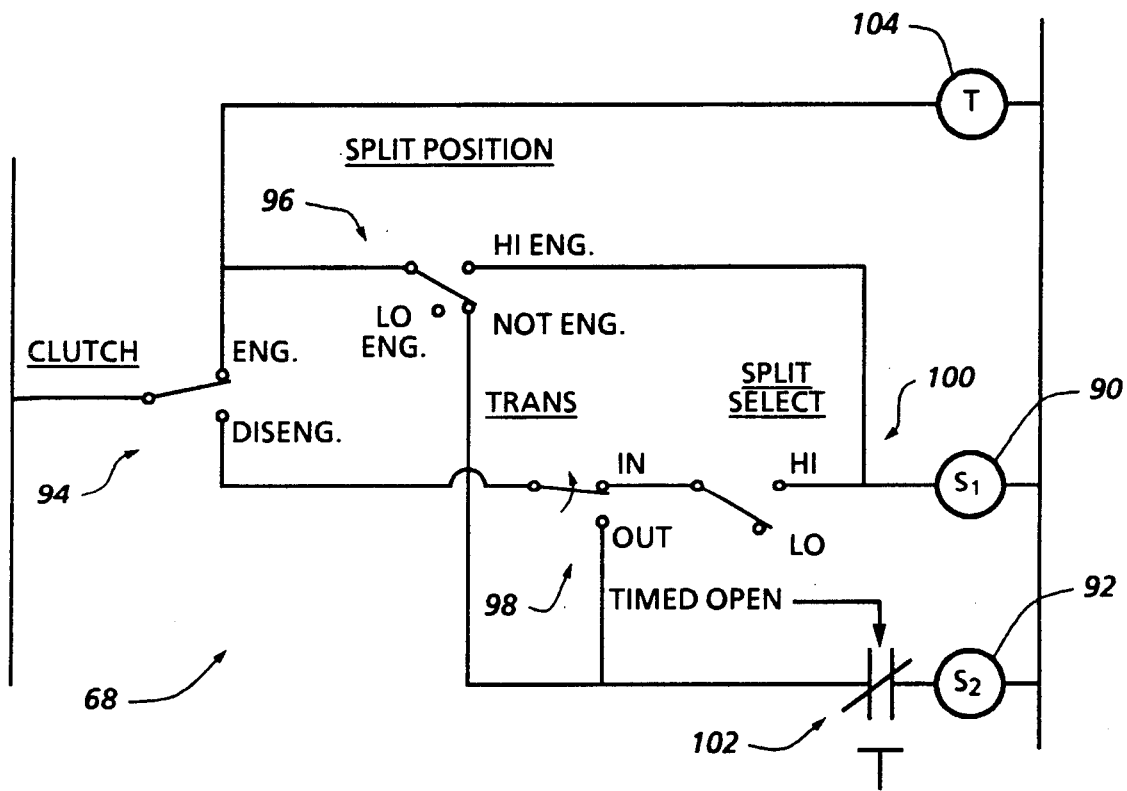
Figure 9D:
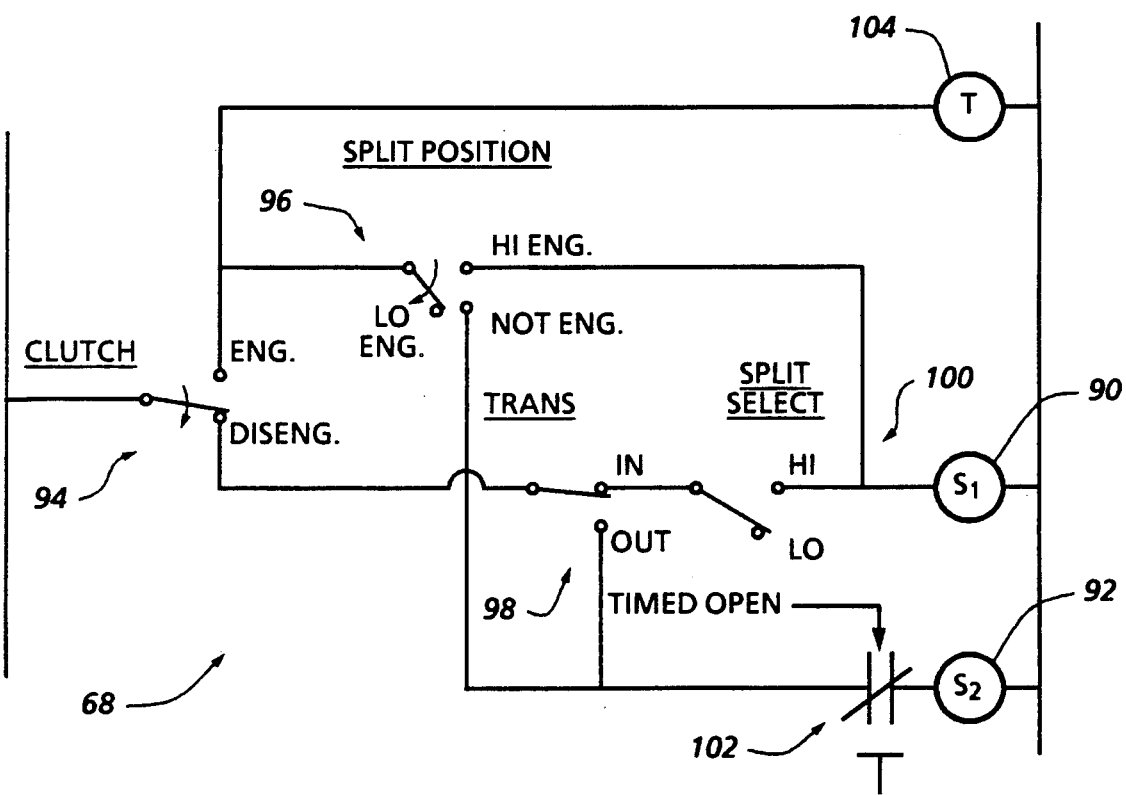
Figure 9E:
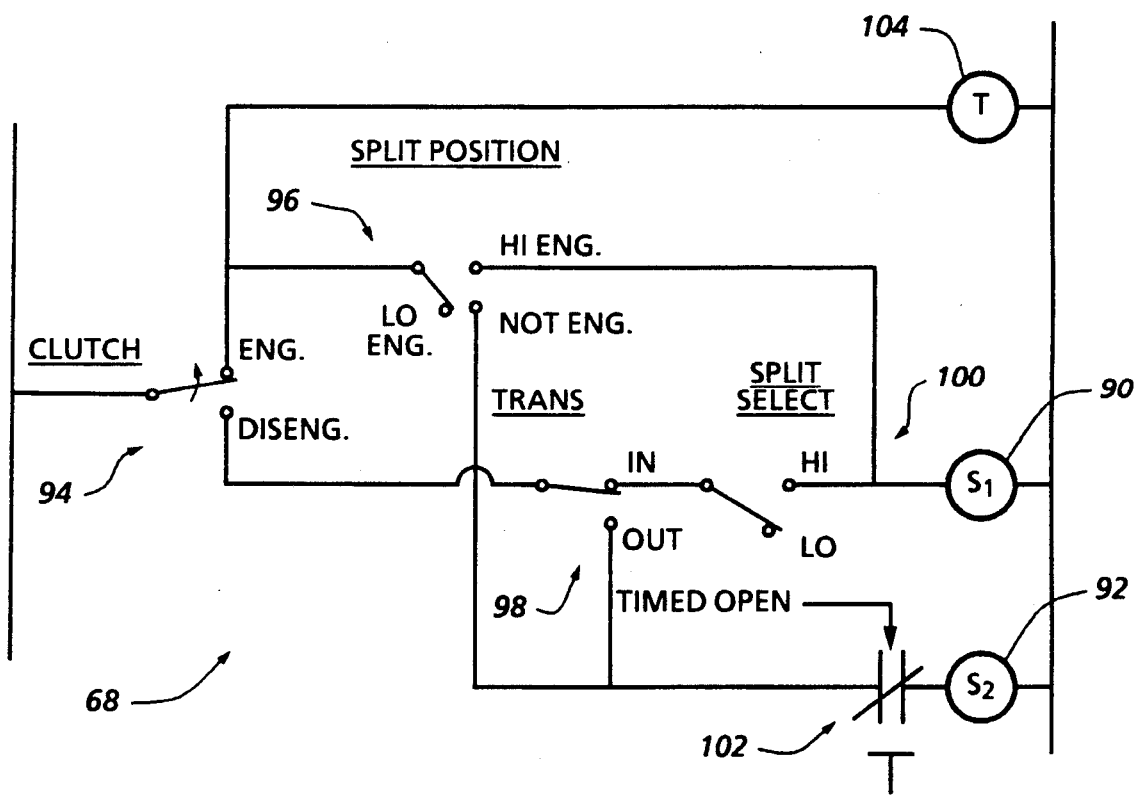

FIGS. 9A-9E schematically illustrates the sequence of operations of control 68 during a start-from-stop operation of the vehicle with a preselection of operation of input section low speed ratio operation. Referring to FIG. 9A, the master clutch is disengaged as may be seen at switch 94, the input section 12 is in the not engaged condition as may be seen at switch 96, the main transmission section is not engaged as may be seen at switch 98 and low-speed splitter ratio has been preselected as may be seen at switch 100. In this condition, solenoid 90 is deenergized and solenoid 92 is energized across switch 94, switch 98 and contact 102. In FIG. 9B, the operator has engaged the master clutch as may be seen at switch 94, causing timing solenoid 104 to be energized resulting in a momentary opening of timed open contact 102 which results in the deenergization of solenoid 92 for momentary attempted engagement of the input section low-speed ratio. The master clutch is momentarily reengaged by the operator to rotate the main transmission section off of the synchronizer blocks as is a known method of operation for synchronized transmissions of the type illustrated in FIG. 1. It is noted that during the timed open condition of contact 102, switch 96 will move toward the low engaged position but actually will remain in the not engaged position thereof which will not effect the deenergized condition of solenoid 92. It is also important to note, that the operation of timing solenoid 104 and contact 102 to deenergized solenoid 92 for a momentary attempted engagement of the low-speed input section ratio to knock the synchronizers of the main transmission section off the blocked positions thereof would occur in a similar manner if switch 98 were in the high-speed ratio preselection position thereof. In FIG. 9C, the main transmission has been shifted to an engaged ratio, causing a change in switch 98 and a master clutch remains engaged. Solenoid 90 remains deenergized and solenoid 92 remains energized and, thus, the input splitter section 12 remains in a not engaged condition. In FIG. 9D, the master clutch is disengaged causing solenoid 92 to be deenergized and maintaining solenoid 90 deenergized causing the low speed input section ratio to be engaged. As this occurs, switch 96 will move from the not engaged to low engaged position which will not effect the maintained deenergization of solenoid 92. As the clutch is reengaged, the control circuit will return to the stable operation in a low speed input section gear ratio as seen in FIG. 9E.

The circuit 68 described above, is by way of example only and numerous modifications and rearrangements the switches, contacts and wiring thereof are, of course, possible. It is important to note, that the control 68 of the present invention will provide several functions which are essential to proper operation of the transmission system of FIG. 1. By way of example, when the main transmission section 14 is not fully engaged in a ratio and the master clutch 20 is moved from the disengaged to the engaged position thereof, the input section will be momentarily engaged in a selected ratio, in this example the low-speed ratio, to allow rotation of the synchronizer blockers off the blocked positions thereof for start-from-stop operation. Further, for lower force and quicker synchronization of the main transmission section, upon disengagement of the master clutch 20 and of the main transmission section 14, the input section 12 will automatically be positioned in the not engaged condition thereof. With the exception of a possible momentary engagement of low-speed gear ratio upon engagement of the master clutch, the input section 12 will remain disengaged until engagement of the main transmission section 14. Additionally, if the main transmission section remains fully engaged in a main transmission section ratio, disengagement of the vehicle master clutch will not effect the then existing condition of the transmission input section.

Accordingly, it may be seen that a relatively simple control for controlling the splitter type input section of a compound synchronized manually shifted transmission is provided.

It is understood, of course, that the present invention is not limited to the particular embodiment illustrated described above but also includes modifications and rearrangements of the parts within the scope of the following claims.

I claim:

1. A control system (68) for a splitter type input section of a manually shifted compound vehicular transmission (10) comprising a multi-speed synchronized splitter type input section (12) connected in series with a multi-speed manually shifted synchronized main transmission section (14), said input section adapted to be drivingly connected to a vehicular prime mover (16) by a manually operated normally closed master friction clutch (20), a manually operated shift control (54) for selective engagement and disengagement of selected main transmission section ratios, a master control unit (56) for operator selection/preselection of either a low-speed or high-speed input section transmission ratio, and a remote actuator unit (46) for causing said input section to be (i) engaged in the high-speed ratio thereof, (ii) engaged in the low-speed ratio thereof or (iii) maintained in a not engaged condition thereof, said actuator responsive to command signals from said control, said control system characterized by:
   a sensor (58) for providing a signal indicative of the engaged or disengaged condition of said master clutch (20);
   a sensor (62) for providing input signals indicative of either said main transmission section being engaged or not engaged in a main transmission section ratio; and
   means effective upon sensing disengagement of said master clutch and said main transmission section not engaged in a main transmission section ratio to cause said input section to be shifted to the not engaged (N) condition thereof.

2. The control system of claim 1 further including means effective upon causing said input section to be shifted to the not engaged condition thereof to maintain said input section in said not engaged condition until engagement of a main transmission section ratio is sensed, and upon sensing engagement of a main transmission section ratio to cause said input section to be shifted to a selected ratio thereof.

3. The control system of claim 1 or claim 2 further comprising means effective upon (i) sensing that said main transmission section is not engaged in a main transmission section ratio and (ii) sensing that said master clutch is caused to go from a disengaged to engaged condition thereof, to cause said input section to be shifted from the not engaged position to an engaged condition for a brief period of time and then immediately shifted back to the not engaged position thereof.

4. The control system of claim 1 further comprising a sensor (60) for providing an output signal indicative of either input section high-speed ratio engaged, input section low-speed ratio engaged or input section not engaged.

5. The control system of claim 1 further comprising a sensor (64) for providing a signal indicative of operator selection/preselection of either low-speed or high-speed input section gear ratio.

6. The control system of claim 1 wherein said actuator (46) comprises a piston and cylinder assembly defining a first chamber constantly exposed to pressurized fluid and a second and third chamber each selectively pressurized or connected to exhaust by a first and second, respectively, solenoid controlled valve.

7. The control system of claim 1 comprising a contact (102) of one of the normally open/timed closed or normally closed/timed open type and means (104) for sensing initial engagement of said master clutch to cause said contact to momentarily assume the timed condition thereof.

8. The control system of claim 7 wherein said time period is about one-tenth (1/10th) of one second (0.1 sec.).

9. A method for controlling a splitter type input section of a manually shifted compound vehicular transmission comprising a multi-speed synchronized splitter type input section connected in series with a multi-speed manually shifted synchronized main transmission section, said input section adapted to be drivingly connected to a vehicular prime mover by a manually operated normally closed master friction clutch, a manually operated shift control for selective engagement and disengagement of selected main transmission section ratios, a master control unit for operator selection/preselection of either a low speed or high speed input section transmission ratio, and a remote actuation unit for causing said input section to be (i) engaged in the high speed ratio thereof, (ii) engaged in the low speed ratio thereof or (iii) maintained in a not engaged condition thereof, said actuator responsive to command signals from a controlled unit, said method characterized by:
   receiving input signals from a first sensor (58) indicative of the engaged or disengaged condition of said master clutch;
   receiving input signals from a second sensor (62) indicative of either said main transmission section being engaged or not engaged in a main transmission section ratio; and
   upon sensing disengagement of said master clutch and said main transmission section not being engaged in a main transmission section ratio, causing said input section to be shifted to the not engaged (N) condition thereof.

10. The method of claim 9 further including the step of;
    upon causing said input section to be shifted to the not engaged condition thereof, maintaining said input section in said not engaged condition until engagement of said main transmission section ratio is sensed; and
    upon sensing engagement of a main transmission section ratio, causing said input section to be shifted to a selected ratio thereof.

11. A method of claims 9 or 10 including the further step of;
    upon sensing that said main transmission section is not engaged in a main transmission section ratio and sensing that said master clutch is caused to go from a disengaged to engaged condition thereof, causing said input section to be shifted from the not engaged position to an engaged position for a brief period of time and then immediately shifted back to the not engaged position thereof.

* * * * *